United States Patent [19]

Schonlau et al.

[11] Patent Number: 5,161,863
[45] Date of Patent: Nov. 10, 1992

[54] BRAKING PRESSURE CONTROL DEVICE FOR AUTOMOTIVE VEHICLES

[75] Inventors: Juergen Schonlau, Walluf; Alfred Birkenbach, Hattersheim, both of Fed. Rep. of Germany

[73] Assignee: Alfred Teves GmbH, Frankfurt am Main, Fed. Rep. of Germany

[21] Appl. No.: 648,084

[22] Filed: Jan. 31, 1991

[30] Foreign Application Priority Data

Feb. 3, 1990 [DE] Fed. Rep. of Germany ....... 4003246

[51] Int. Cl.$^5$ ................................................ B60T 8/28
[52] U.S. Cl. ................................... 303/9.68; 303/9.75; 303/24.1; 188/349
[58] Field of Search .................... 303/24.1, 9.62, 9.67, 303/9.68, 9.73, 9.75; 188/349

[56] References Cited

U.S. PATENT DOCUMENTS

| | | | |
|---|---|---|---|
| 3,980,343 | 9/1976 | Stelzer | 303/9.68 |
| 4,544,210 | 10/1985 | Nagashima | 303/9.67 |
| 4,840,433 | 6/1989 | Schonlau et al. | 303/9.68 |
| 5,022,715 | 6/1991 | Schonlau | 303/9.68 |

FOREIGN PATENT DOCUMENTS

| | | | |
|---|---|---|---|
| 3902789 | 8/1990 | Fed. Rep. of Germany | 303/9.68 |
| 0131849 | 6/1987 | Japan | 303/9.67 |
| 2032550 | 5/1980 | United Kingdom . | |
| 2042110 | 9/1980 | United Kingdom | 303/9.68 |
| 2065806 | 7/1981 | United Kingdom | 303/9.68 |
| 2130323 | 5/1984 | United Kingdom . | |
| 2202597 | 9/1988 | United Kingdom . | |

*Primary Examiner*—Robert J. Oberleitner
*Assistant Examiner*—Josie A. Ballato
*Attorney, Agent, or Firm*—Robert P. Seitter; J. Gordon Lewis

[57] ABSTRACT

The present invention relates to a braking pressure control device for automotive vehicles including a regulating valve, composed of a regulating piston (5) and a valve closure member (6), which governs the connection between a pressure-fluid inlet (3) and a pressure-fluid outlet (4). The valve closure member (6) is coupled to a pressure-responsive displaceable control piston (20). The control device also includes a deceleration responsive deflectable inertia member (33). The displacement of the control piston (20) is controlled as a function of the position of the inertia member. In order to simply accomplish an abrupt and temperature-independent locking of the control piston when a deceleration value is exceeded, the inertia member (33) moves into a mechanical latching engagement with the control piston (20).

6 Claims, 1 Drawing Sheet

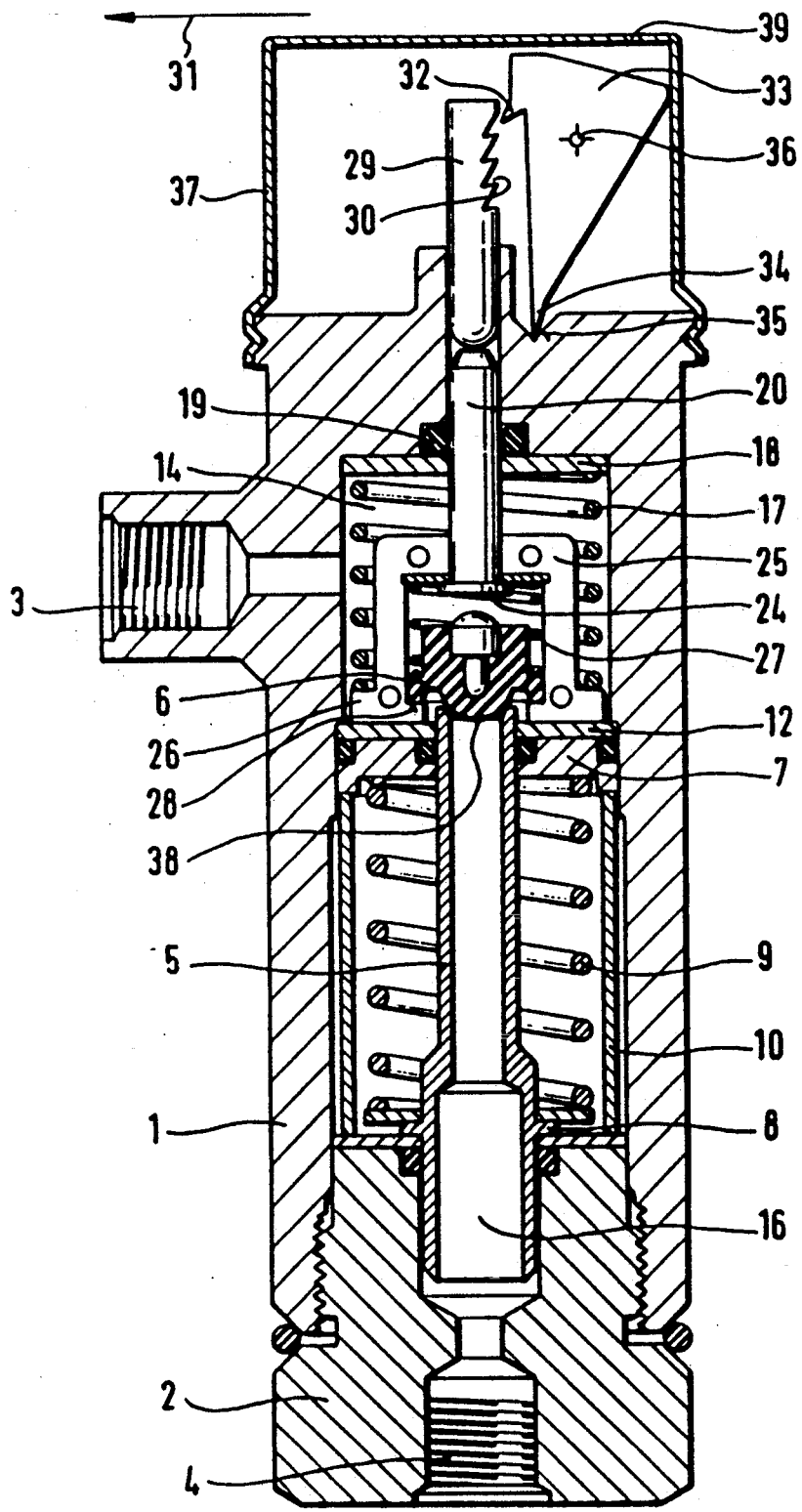

BRAKING PRESSURE CONTROL DEVICE FOR AUTOMOTIVE VEHICLES

INTRODUCTION

The present invention relates to a proportioning braking pressure control device for automotive vehicles responsive to the deceleration of the vehicle.

BACKGROUND OF THE INVENTION

A like control device is known as EP 0 175 089 B1, wherein an inertia member serves to control a switch valve which is interposed between a brake fluid tank and a chamber confined by a control piston. The switch valve is designed as a tilting valve which is kept open by the inertial member until a determined declaration is reached and the spherical inertial member ascends a ramp to permit the tilting valve to close. The chamber is shut off starting from this point of time, and further displacement of the control piston into the chamber it confines is not possible so that, after further rise of the master cylinder pressure, the regulating piston can be brought into sealing engagement with the valve closure member.

The mentioned state of the art entails several shortcomings. On the one hand, the hydraulic locking of the control piston by a closable chamber involves great structural forces. On the other hand, the movement of the inertial member is viscosity-responsive and hence temperature-responsive, in addition thereto the ball-ramp arrangement does not provide the necessary, very short on/off time of the switch valve.

SUMMARY OF THE INvENTION

Therefore, the present invention has for its object to provide a proportioning braking pressure control device for automotive vehicles which is activated upon the vehicle reaching a predetermined rate of deceleration. The device is simple, and, moreover, accomplishes rapid locking of the control piston without being affected by temperature changes.

This object is achieved by an inertial member which is shifted at a predetermined deceleration rate to latch to and hold an element driven by the control piston and brake pressure to thereby initiate brake pressure proportioning at that point. A preferred embodiment of this invention provides that the latching mechanical engagement is performed by virtue of a graduated mating features, owing whereto the control piston can be locked in almost any position desired in the presence of a sufficiently fine spacing of the features. In a favorable design of this invention, the graduated features are provided in the form of a saw-tooth profile on the control piston or on an element connected to the control piston. Moved by a defined vehicle deceleration, a latching hook on the inertial member engages into one of the saw tooth features.

Although it is also possible to design a saw-tooth profile on the inertial member and a latching hook on the control piston, the inertial member would have to undergo machining in this case, and this would be disadvantageous inasmuch as the latter member must have a precisely defined weight and an exactly determined center of gravity.

The inertia member can be supported in a particularly simple manner by means of a knife-edge support. In order to prevent the inertia member from being lifted from the support after its engagement with the control piston, it is arranged for that there is only a very small clearance between the side of the inertia member opposite to the knife-edge support and an abutment surface on the housing, at least in the inertial member's shifted condition. The forces generated by the control piston are thus not absorbed by the support but by the abutment surface and into the housing.

Further advantageous features as well as the function of this invention can be gathered from the following description of a preferred embodiment of the invention with reference to the accompanying drawing.

BRIEF DESCRIPTION OF THE DRAWING

The figure represents the preferred embodiment of the proportioning braking pressure control device according to the present invention in partial cross-section to illustrate the internal details thereof with the device in the inactivated condition.

DETAILED DESCRIPTION OF THE PREFERRED EMBODIMENT

The pressure regulating device illustrated in the figure includes a housing 1 with an axial bore stepped several times and accommodating elements of a pressure regulating valve means, i.e., a regulating piston 5, and a value closure member 6. The stepped bore is closed by a threaded plug 2. The pressure regulating valve means incorporates the regulating piston 5 which, with its one end, is axially slidably supported in the threaded plug 2 and, with its other end, is sealedly supported in a guide sleeve 7. The regulating piston 5 is designed as a stepped hollow cylinder whose larger-diameter step is adjacent to an outlet 4 provided in the threaded plug 2. The regulating piston 5 includes a shoulder 8 acted upon by a regulating spring 9 and which serves as an abutment surface for a stop fixed with respect to the housing 1. With its other end, the regulating spring 9 bears against the guide sleeve 7 which is fixed by the threaded plug 2, by means of a spacer sleeve 10, on a shoulder of the axial bore of the housing 1 via an intermediary washer 12. A channel 16 extending axially through the regulating piston 5 connects the outlet 4 to an inlet chamber 14 opening into which is the connecting bore for an inlet 3. The pressure regulating device is mounted in the vehicle such that the longitudinal axis of the axial bore of the housing 1 extends in the vertical plane.

A control piston 20 projects into the inlet chamber 14 from the side opposite to the washer 12, the control piston 20 being sealedly guided in the axial bore of the housing 1. The end of the control piston 20 projecting into the inlet chamber 14 includes a collar 24 which serves as a follower mechanism for a bell-shaped guide housing 25. The guide housing 25 comprises a shoulder 26 on its side away from the control piston 20, on which shoulder a control spring 17 is supported which prestresses the guide housing 25 and, in conjunction therewith, the control piston 20 in the direction of the regulating piston 5. The control spring 17 bears against a washer 18 formed fast with the housing and securing a ring seal 19 which seals the control piston 20.

Arranged in the guide housing 25 is the valve closure member 6 which is biased by a valve spring 27 in the direction of the regulating piston 5 and which takes support in an inwardly disposed step 28 of the guide housing 25.

With its side opposite to the collar 24, the control piston 20 bears against a locking member 29 which is also guided in the axial bore of the housing 1. Locking member 29 is designed as a separate component part from the control piston 20 in order to avoid damage to the ring seal 19 during the assembly, on the one hand, while, on the other hand, the locking member 29 must be prevented from turning, which is not necessary with the control piston 20. On its opposite side from the driving direction of the vehicle, (in the direction of arrow 31) the locking member 29 is furnished with graduated latching features 30 shaped as a saw-tooth profile.

Associated with the latching features 30 is a latching hook 32 which is formed on the inertia member 33. The inertia member 33 is tiltably supported in a groove 35 of the housing 1 by virtue of the knife-edge type section 34. The position of the center of gravity 36 of the inertia member and the support 34, 35 are conformed to one another in a fashion such that the inertia member 33 will always move to abut on the wall of a bowl-shaped housing part 37 that lies opposite to the latching features 30 as long as the inertial member 33 is not subjected to inertial forces above a predetermined level generated by the vehicle deceleration.

In the non-activated condition, the pressure regulating device assumes the position illustrated in the figure. Upon the commencement of brake actuation, the pressure introduced into the inlet chamber 14 by the (non-illustrated) master cylinder is applied via ducts in the guide housing 25 and the channel 16 in the regulating piston 5 to the outlet 4 in an unreduced manner, to which outlet the rear-wheel brakes (not shown) are connected. Upon further rise in the inlet pressure, the regulating piston 5 will be shifted into the inlet chamber 14 starting from a pressure determined by the pressurized surfaces on the regulating piston 5 and by regulating spring 9. Simultaneously, the pressure in the inlet chamber 14 causes the control piston 20 coupled to the valve closure member 6 to displace in an opposite direction to the force of the control spring 17, while the locking member 29 is pushed upwards.

The pressurized surfaces on the regulating piston 5 and on the control piston 20 as well as the spring rates of the control spring 17 and of the regulating spring 9 are set such that during this equidirectional movement of the regulating piston 5 and valve closure member 6, the hemispherical seal portion 38 of the valve closure member 6 is not permitted to move into abutment on its mating surface on the regulating piston 5. Thus, the fluid connection between the inlet chamber 14 and the outlet 4 is maintained for the time being.

The inertia member 33 is shifted from its normal position upon a computed predetermined deceleration value being experienced by the automotive vehicle, whereby the latching hook 32 engages into one of the latching features 30. Control piston 20 and locking member 29 can thereafter only be moved upwards to a very limited degree, since the inertia member 33 moves with its side opposite to the section 34 to abut on the top 39 of the housing part 37 after having overcome a minimum clearance.

The control piston 20 and hence the valve closure member 6 thereafter remain in the position at the point whereat abutment occurred, whilst the regulating piston 5, on further pressure rise, continues to move into the inlet chamber 14 in opposition to the force of the regulating spring 9 until it abuts on the seal portion 38 of the valve closure member 6 and the passage from the inlet chamber 14 to the outlet 4 is closed.

When the pressure continues to rise in the inlet chamber 14, the regulating piston 5 moves to and fro in rapid sequence, thereby constantly opening and closing the passage at the valve closure member 6. During this action the pressure in the outlet 4 is reduced in relation to the pressure in the inlet chamber 14 corresponding to the ratio of the pressurized surfaces on the regulating piston 5 to provide a proportionate reduction in rear brake pressure.

As soon as the deceleration value of the automotive vehicle drops below a predefined threshold, the inertia member 33 will fall back into its initial position, since, owing to the support 34, 35, the center of gravity 36 in respect of the vertical plane will always be disposed on the side remote from the locking member 29.

What is claimed is:

1. A proportioning braking pressure control device for automotive vehicles said device comprising a housing, a fluid inlet, a fluid outlet, a regulating valve, means including a regulating piston and a valve closure member, a regulating spring acting on said regulating piston, said regulating piston subjected to fluid pressure at said outlet to be urged to seat on said valve closure member adjacent the force of said regulating spring, said regulating piston and said valve closure member thereby coacting with each other to modulate fluid communication between said inlet and said outlet, said valve closure member operatively associated with an inlet pressure responsive control means, including a control piston and a control spring, said control piston progressively displaced against the force of said control spring in response to increasingly control inlet fluid pressure, said valve closure member coupled to said control piston to be displaced away with said control piston to prevent said modulation of fluid communication between said inlet and said outlet; and, an inertia member, support means mounting said inertia member to be shiftable from a gravity biased position to an advanced position when said vehicle experiences a predetermined deceleration rate, latching engagement means operative to stop the displacement of said control piston in at least one axial direction in response to shifting of said inertia member to said advanced position, said latching engagement means includes a locking member progressively displaced with said control piston and a series of latching engagement features on said inertia member and said locking member moved into latching engagement at various displaced positions of said control piston and locking member upon shifting of said inertia member to said advanced position to stop further displacement of said control piston from said displaced position whereat said latching engagement occurs.

2. A braking pressure control device as claimed in claim 1, wherein said engagement features on said inertia member and locking member define a hooking engagement therebetween.

3. A braking pressure control device as claimed in claim 2, wherein said engagement features define multiple engagement points whereby displacement of said piston can be checked in one of a plurality of positions in response to shifting of said inertia member to said advanced position.

4. The braking pressure control deviced as claimed in claim 3, wherein a series of saw teeth are formed in said locking member and a hook is formed on said inertia member adapted to be received into one of said saw tooth, said saw tooth and said hook comprising said latching engagement features.

5. A braking pressure control device as claimed in claim 1, wherein said support means for said inertia member comprises a knife-edge support.

6. A braking pressure control device as claimed in claim 5, further including an abutment on a side of the inertia member opposite to the knife-edge support closely spaced over said side of said inertia member when said inertia member is in said advanced position.

* * * * *